(12) United States Patent
Hwang et al.

(10) Patent No.: US 10,257,013 B2
(45) Date of Patent: *Apr. 9, 2019

(54) SIGNAL MODULATION AND DEMODULATION FOR MULTIUSER SUPERPOSITION TRANSMISSION SCHEME

(71) Applicant: HFI INNOVATION, INC., Zhubei, Hsinchu County (TW)

(72) Inventors: Chien-Hwa Hwang, Zhubei (TW); Yi-Ju Liao, Hsinchu (TW); Tsang-Wei Yu, Zhubei (TW); Lung-Sheng Tsai, Tainan (TW); Tze-Ping Low, Lexington, MA (US); Pei-Kai Liao, Nantou County (TW)

(73) Assignee: HFI INNOVATION, INC., Zhubei, Hsinchu County (TW)

( * ) Notice: Subject to any disclaimer, the term of this patent is extended or adjusted under 35 U.S.C. 154(b) by 86 days.

This patent is subject to a terminal disclaimer.

(21) Appl. No.: 15/235,695

(22) Filed: Aug. 12, 2016

(65) Prior Publication Data

US 2017/0048840 A1 Feb. 16, 2017

Related U.S. Application Data

(60) Provisional application No. 62/218,047, filed on Sep. 14, 2015, provisional application No. 62/205,157, filed on Aug. 14, 2015.

(51) Int. Cl.
*H04L 27/34* (2006.01)
*H04L 5/00* (2006.01)
*H04J 11/00* (2006.01)

(52) U.S. Cl.
CPC ...... *H04L 27/3488* (2013.01); *H04L 27/3483* (2013.01); *H04J 11/0046* (2013.01); *H04L 5/0046* (2013.01)

(58) Field of Classification Search
CPC ............. H04L 27/3488; H04L 27/3483; H04L 5/0046; H04J 11/0046
See application file for complete search history.

(56) References Cited

U.S. PATENT DOCUMENTS 7,876,784 B1   1/2011 Lee ............................. 370/473
8,879,653 B2   11/2014 Li ............................... 375/261
(Continued)

FOREIGN PATENT DOCUMENTS

CN   101640940 A   7/2008
CN   101686101 A   9/2008
(Continued)

OTHER PUBLICATIONS

International Search Report and Written Opinion of International Search Authority for PCT/CN2016/095227 dated Nov. 2, 2016 (12 pages).
(Continued)

*Primary Examiner* — Jianye Wu
(74) *Attorney, Agent, or Firm* — Oblon, McClelland, Maier & Neustadt, L.L.P.

(57) ABSTRACT

A method of modulating and demodulating superposed signals for MUST scheme is proposed. A transmitter takes bit sequences intended for multiple receivers under MUST scheme to go through a "bit sequence to constellation points" mapper before entering the modulators to satisfy the Gray coding rule and to achieve high demodulation performance for the receivers. In a first method, each bit sequence is assigned for each constellation point on the constellation map to satisfy one or more conditions under different power split factors. In a second method, the constellation map is divided into sub-regions according to the clustering of the constellation points for bit sequence assignment. A near-UE may use an ML receiver for demodulation and decoding the superposed signal. A far-UE may use an ML receiver or an
(Continued)

MMSE receiver for demodulation and decoding the superposed signal.

16 Claims, 8 Drawing Sheets

(56) References Cited

U.S. PATENT DOCUMENTS

| | | | |
|---|---|---|---|
| 2003/0112901 A1 | 6/2003 | Gupta | 375/340 |
| 2009/0022242 A1 | 1/2009 | Waters et al. | 375/299 |
| 2009/0135926 A1 | 5/2009 | Tsouri et al. | 375/260 |
| 2010/0046644 A1 | 2/2010 | Mazet | 375/260 |
| 2012/0093249 A1 | 4/2012 | Sun et al. | 375/265 |
| 2012/0257689 A1 | 10/2012 | Hong et al. | 375/295 |
| 2013/0286956 A1 | 10/2013 | Lee | 370/329 |
| 2014/0286291 A1 | 9/2014 | Einhaus et al. | 370/329 |
| 2015/0124902 A1 | 5/2015 | Goto et al. | |
| 2016/0309542 A1* | 10/2016 | Kowalski | H03M 13/2707 |
| 2016/0316513 A1* | 10/2016 | Lee | H04W 72/1247 |
| 2016/0337018 A1* | 11/2016 | Hwang | H04L 5/003 |
| 2016/0366003 A1* | 12/2016 | Kwon | H04L 1/0001 |
| 2016/0366691 A1* | 12/2016 | Kwon | H04L 1/0001 |

FOREIGN PATENT DOCUMENTS

| | | |
|---|---|---|
| CN | 102387105 A | 8/2010 |
| EP | 2590336 A1 | 11/2011 |
| EP | 2 981 017 A1 | 2/2016 |
| WO | WO2007039908 A2 | 10/2005 |
| WO | WO 2007039908 A2 | 4/2007 |

OTHER PUBLICATIONS

International Search Report and Written Opinion of International Search Authority for PCT/CN2016/095226 dated Nov. 9, 2016 (11 pages).
USPTO, office action for related U.S. Appl. No. 15/235,745 dated Nov. 24, 2017 (17 pages).
Extended European Search Report dated Jun. 22, 2018 for Application No. 16836627.6-1219/3311513 PCT/CN2016095226, 9 pages.
Extended European Search Report dated Apr. 20, 2018 for Application No. 16836628.4-1219/3311619 PCT/CN2016095227, 10 pages.
Agenda Item: 6.2.7.3; Qualcomm Incorporated; "Multiuser superposition schemes"; Document for: Discussion and Decision; 3GPP TSG RAN WG1 #81; R1-152806; May 25-29, 2015, Fukuoka, Japan, 4 pages.

* cited by examiner

SIGNAL MODULATION AND DEMODULATION FOR MULTIUSER SUPERPOSITION TRANSMISSION SCHEME

CROSS REFERENCE TO RELATED APPLICATIONS

This application claims priority under 35 U.S.C. § 119 from U.S. Provisional Application No. 62/205,157, entitled "Modulation for Multiuser Superposition Transmission scheme," filed on Aug. 14, 2015; U.S. Provisional Application No. 62/218,047, entitled "Signal Design and Demodulation for Multiuser Superposition Transmission scheme," filed on Sep. 14, 2015, the subject matter of which is incorporated herein by reference.

TECHNICAL FIELD

The disclosed embodiments relate generally to mobile communication networks, and, more particularly, to methods of signal modulation and demodulation for multiuser superposition transmission scheme in mobile communication systems.

BACKGROUND

Long Term Evolution (LTE) is an improved universal mobile telecommunication system (UMTS) that provides higher data rate, lower latency and improved system capacity. In LTE systems, an evolved universal terrestrial radio access network includes a plurality of base stations, referred as evolved Node-Bs (eNBs), communicating with a plurality of mobile stations, referred as user equipment (UE). A UE may communicate with a base station or an eNB via the downlink and uplink. The downlink (DL) refers to the communication from the base station to the UE. The uplink (UL) refers to the communication from the UE to the base station. LTE is commonly marketed as 4G LTE, and the LTE standard is developed by 3GPP.

In a wireless cellular communications system, multiuser multiple-input multiple-output (MU-MIMO) is a promising technique to significantly increase the cell capacity. In MU-MIMO, the signals intended to different users are simultaneously transmitted with orthogonal (or quasi-orthogonal) precoders. On top of that, the concept of a joint optimization of MU operation from both transmitter and receiver's perspective has the potential to further improve MU system capacity even if the transmission and precoding is non-orthogonal. For example, the simultaneous transmission of a large number of non-orthogonal beams/layers with the possibility of more than one layer of data transmission in a beam. Such non-orthogonal transmission could allow multiple users to share the same resource elements without spatial separation, and allow improving the multiuser system capacity for networks with a small number of transmit antennas (i.e. 2 or 4, or even 1), where MU-MIMO based on spatial multiplexing is typically limited by wide beamwidth.

Multi-user superposition transmission (MUST) is a new technique of such joint optimization associated with power allocation and interference cancellation to enable high system capacity in LTE networks. It is under investigation in LTE Release-13. It may include two commonly discussed multi-user transmission approaches, MU-MIMO, and non-orthogonal multiple access (NOMA). The MU-MIMO approach transmits signals intended to different users with orthogonal (or quasi-orthogonal) precoders. In contrast, the NOMA approach tends to precode transmitted signals for co-channel users by same spatial direction with un-equal power allocation.

MUST technique allows simultaneous transmission for multiple users on the same time-frequency resources. A serving base station pairs two or more users together, and applies transmit beamforming (precoding) derived from channel information feedback to achieve transmission of multiple transport-blocks to multiple users. As a result, the mutual interference between the co-channel transmissions to multiple mobile stations could degrade performance seriously. Fortunately, with a proper design on the power allocation, the code-rate, and modulation order of the co-channel signals, and assisted information for the signal format of un-wanted interference, it is possible to let a UE cancel the unwanted co-channel interference intended for other UEs.

Consider two particular users in a cell of a cellular communications system. One of the users has a good channel quality probably because it is geometrically close to the base station (BS). This user is called the near-user equipment (UE). The other user has a relatively worse signal quality than the near-UE probably due to the larger distance from the BS. This user is called the far-UE. When multiuser superposition transmission (MUST) is used, the signals intended to the near-UE and the far-UE are superposed. According to theoretical analysis, such superposition transmission provides a larger weighted sum rate than the orthogonal transmission scheme such as the time division multiple access (TDMA) when users scheduling fairness is taken into account.

The simplest way to implement the modulation of the MUST scheme is passing the bits for the near-UE and far-UE individually to their modulators and summing up the modulated symbols. This scheme is called Non-Orthogonal Multiple Access (NOMA). However, the constellation points resulting from such modulation scheme may not follow the Gray coding rule, i.e., the bit sequences corresponding to two adjacent constellation points differ in only one bit. A modified modulation scheme is called Semi-Orthogonal Multiple Access (SOMA). Under SOMA, the coded bits of the far-UE is passed directly to the far-UE's modulator, while the coded bits of the near-UE goes through a Gray converter before entering its modulator. The Gray converter enables the constellation points of the superposed signal to fit the rule of Gray coding, i.e., the bit sequences of two adjacent constellation points differ in only one bit. When the power split factor $0<\alpha<1$ (the ratio of power allocated to the near-UE) is small, the constellation points corresponding to the same far-UE bit sequence are close to each other and form a cluster.

However, such clustering of constellation points is not always the case when the power split factor $\alpha$ becomes large. It can be observed the decision regions of different far-user bit sequences overlap with each other, and the performance of demodulation is expected to degrade. A new modulation scheme is sought for superposed signals of MUST scheme.

SUMMARY

A method of modulating and demodulating superposed signals for MUST scheme is proposed. A transmitter takes bit sequences intended for multiple receivers under MUST scheme to go through a "bit sequence to constellation points" mapper before entering the modulators to satisfy the Gray coding rule and to achieve high demodulation performance for the receivers. In a first method, each bit sequence is assigned for each constellation point on the constellation map to satisfy one or more conditions under different power split factors. In a second method, the constellation map is divided into sub-regions according to the clustering of the constellation points for bit sequence assignment. A near-UE may use an ML receiver for demodulation and decoding the superposed signal. A far-UE may use an ML receiver or an MMSE receiver for demodulation and decoding the superposed signal.

In one embodiment, a base station configures a far-UE and a near-UE for MUST operation in a mobile communication network. The base station generates a constellation map based on a first modulation order for the far-UE, a second modulation order for the near-UE, and a power split factor. The base station assigns a bit sequence for each constellation point on the constellation map to satisfy one or more conditions. Each bit sequence comprises n bits assigned for the far-UE concatenated with m bits assigned for the near-UE. The base station modulates and outputs a superposed signal to be transmitted to the far-UE and the near-UE over a time-frequency radio resource based on the assigned bit sequences.

In another embodiment, a UE receives a superposed signal intended for the UE and a co-channel UE under MUST operation in a mobile communication network. The UE generates a constellation map based on a first modulation order for the UE, a second modulation order for the co-channel UE, and a power split factor. The UE associates each constellation points on the constellation map with a bit sequence. Each bit sequence comprises n bits assigned for the UE concatenated with m bits assigned for the co-channel UE. The UE computes an LLR for each coded bit of the UE based on the distances between the received superposed signal and a set of constellation points. In one embodiment, the UE is a far-UE, the co-channel UE is a near UE, and the far-UE receiver is an ML receiver or an MMSE receiver. In another embodiment, the UE is a near-UE, the co-channel UE is a far-UE, and the near-UE receiver is an ML receiver.

Other embodiments and advantages are described in the detailed description below. This summary does not purport to define the invention. The invention is defined by the claims.

BRIEF DESCRIPTION OF THE DRAWINGS

FIG. 8B illustrates one example of Method #1 of bit sequence to constellation point mapping.

FIG. 8C illustrates one example of Method #2 of bit sequence to constellation point mapping.

DETAILED DESCRIPTION

Reference will now be made in detail to some embodiments of the invention, examples of which are illustrated in the accompanying drawings.

Figure 1:
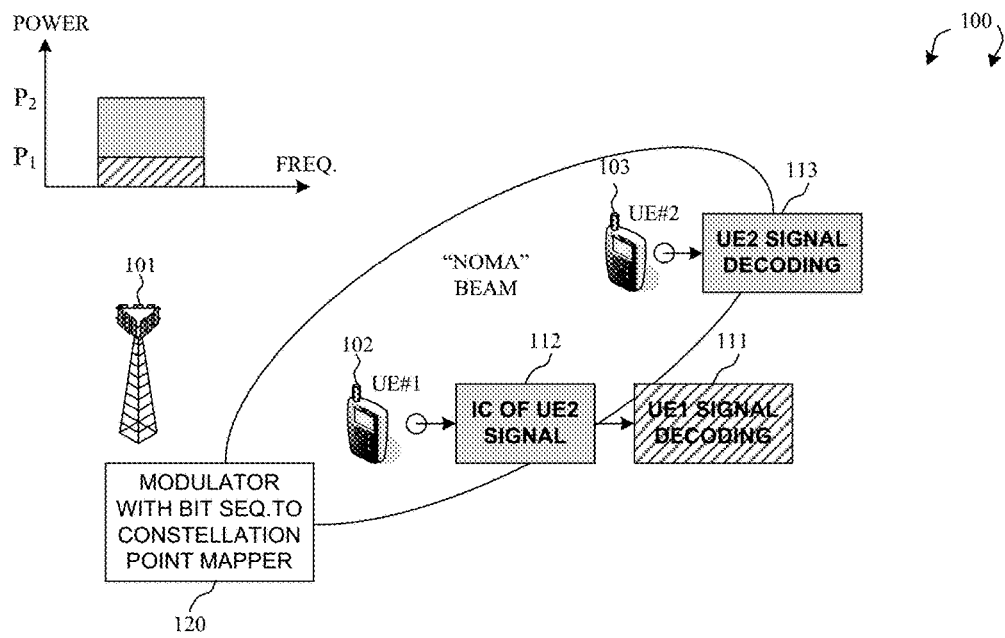
FIG. 1 illustrates a mobile communication network supporting multiuser superposition transmission (MUST) scheme applying a novel modulation in accordance with one novel aspect.

FIG. 1 illustrates a mobile communication network supporting multiuser superposition transmission (MUST) scheme applying a novel modulation in accordance with one novel aspect. Mobile communication network 100 is an OFDM network comprising a serving base station eNB 101, a first user equipment 102 (UE#1), and a second user equipment 103 (UE#2). In 3GPP LTE system based on OFDMA downlink, the radio resource is partitioned into subframes in time domain, each subframe is comprised of two slots. Each OFDMA symbol further consists of a number of OFDMA subcarriers in frequency domain depending on the system bandwidth. The basic unit of the resource grid is called Resource Element (RE), which spans an OFDMA subcarrier over one OFDMA symbol. REs are grouped into resource blocks (RBs), where each RB consists of 12 consecutive subcarriers in one slot.

Several physical downlink channels and reference signals are defined to use a set of resource elements carrying information originating from higher layers. For downlink channels, the Physical Downlink Shared Channel (PDSCH) is the main data-bearing downlink channel in LTE, while the Physical Downlink Control Channel (PDCCH) is used to carry downlink control information (DCI) in LTE. The control information may include scheduling decision, information related to reference signal information, rules forming the corresponding transport block (TB) to be carried by PDSCH, and power control command. For reference signals, Cell-specific reference signals (CRS) are utilized by UEs for the demodulation of control/data channels in non-precoded or codebook-based precoded transmission modes, radio link monitoring and measurements of channel state information (CSI) feedback. UE-specific reference signals (DM-RS) are utilized by UEs for the demodulation of control/data channels in non-codebook-based precoded transmission modes.

Multi-user superposition transmission (MUST) allows simultaneous transmission for multiple users on the same time-frequency resources. In the example of FIG. 1, downlink MUST scheme is used. eNB 101 pairs two or more users (UE#1 and UE#2) together and applies transmit beamforming (precoding) and power allocation derived from channel information feedback to achieve transmission of multiple transport-blocks to multiple users. To benefit from MUST, the two co-scheduled users generally need to have a large difference in the received signal quality, e.g., in terms of the received signal-to-interference-plus-noise ratio (SINR). In a typical scenario, one of the users (e.g., UE#1) is geometrically close to the base station, and the other user (e.g., UE#2) is geometrically far away from the base station. The former user and the latter user are also referred to as the near-UE and the far-UE, respectively.

As shown in FIG. 1, UE#1 receives intra-cell interfering radio signal 112 transmitted from the same serving eNB 101 due to non-orthogonal multiple access (NOMA) operation intended for multiple UEs (e.g., UE#2) in the same serving cell. For NOMA operation, the signals to the two UEs are superposed and precoded with the same precoder and transmitted over the same spatial layer (the "NOMA" beam). UE#1 may be equipped with an interference cancellation (IC) receiver that is capable of cancelling the contribution of the interfering signal 112 from the desired signal 111. Typically, the transmit power allocated for the signal dedicated to the far-user (UE#2) $P_2$ is in general much stronger than to the near-user (UE#1) $P_1$. The power ratio between UE#1 and UE#2 is referred as a power split factor $\alpha$. From UE#1's perspective, since it is much close to eNB 101 and has a better received quality of UE#2's signal than UE#2 does, UE#1 can decode the signal dedicated to UE#2. After UE#1 decodes UE#2's information bits, the signal dedicated to UE#2 is reconstructed and then subtracted from the received signal to form a clean received signal. UE#1 can therefore decode its own signal via the clean received signal.

Under a traditional modulator for NOMA, the constellation points resulting from such modulation scheme may not follow the Gray coding rule, i.e., the bit sequences corresponding to two adjacent constellation points differ in only one bit. Adding a Gray converter may not always solve the problem, depending on the value of the power split factor $\alpha$. In accordance with one novel aspect, a new modulation method is proposed for superposed signals of MUST scheme. The proposed modulator applies a bit sequence to constellation point mapper 120, which satisfies the Gray coding rule to achieve high demodulation performance at the receiver side.

Figure 2:
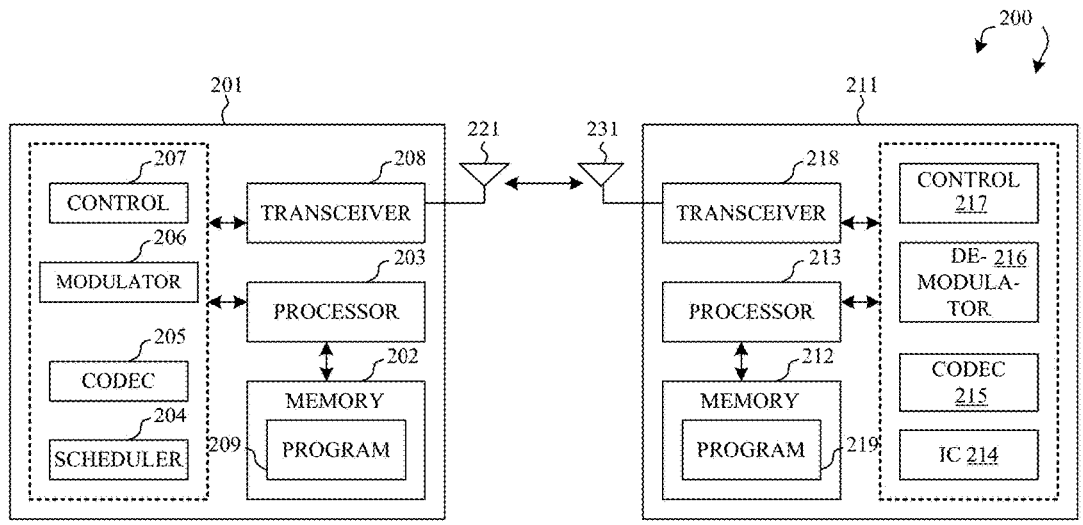
FIG. 2 is a simplified block diagram of a base station and a user equipment that carry out certain embodiments of the present invention.

FIG. 2 is a simplified block diagram of a base station 201 and a user equipment 211 that carry out certain embodiments of the present invention in a mobile communication network 200. For base station 201, antenna 221 transmits and receives radio signals. RF transceiver module 208, coupled with the antenna, receives RF signals from the antenna, converts them to baseband signals and sends them to processor 203. RF transceiver 208 also converts received baseband signals from the processor, converts them to RF signals, and sends out to antenna 221. Processor 203 processes the received baseband signals and invokes different functional modules to perform features in base station 201. Memory 202 stores program instructions and data 209 to control the operations of the base station. Similar configuration exists in UE 211 where antenna 231 transmits and receives RF signals. RF transceiver module 218, coupled with the antenna, receives RF signals from the antenna, converts them to baseband signals and sends them to processor 213. The RF transceiver 218 also converts received baseband signals from the processor, converts them to RF signals, and sends out to antenna 231. Processor 213 processes the received baseband signals and invokes different functional modules to perform features in UE 211. Memory 212 stores program instructions and data 219 to control the operations of the UE.

Base station 201 and UE 211 also include several functional modules and circuits to carry out some embodiments of the present invention. The different functional modules are circuits that can be configured and implemented by software, firmware, hardware, or any combination thereof. The function modules, when executed by the processors 203 and 213 (e.g., via executing program codes 209 and 219), for example, allow base station 201 to schedule (via scheduler 204), encode (via codec 205), modulate (via modulator 206), and transmit control information and data (via control circuit 207) to UE 211, and allow UE 211 to receive, de-modulate (via de-modulator 216), and decode (via codec 215) the control information and data (via control circuit 217) accordingly with interference cancellation capability. In one example of MUST operation, base station 201 takes bit sequences intended for UE 211 (and other co-channel UE) under MUST scheme to go through a "bit sequence to constellation points" mapper before entering the modulators to satisfy the Gray coding rule and to achieve high demodulation performance for UE 211.

Figure 3:
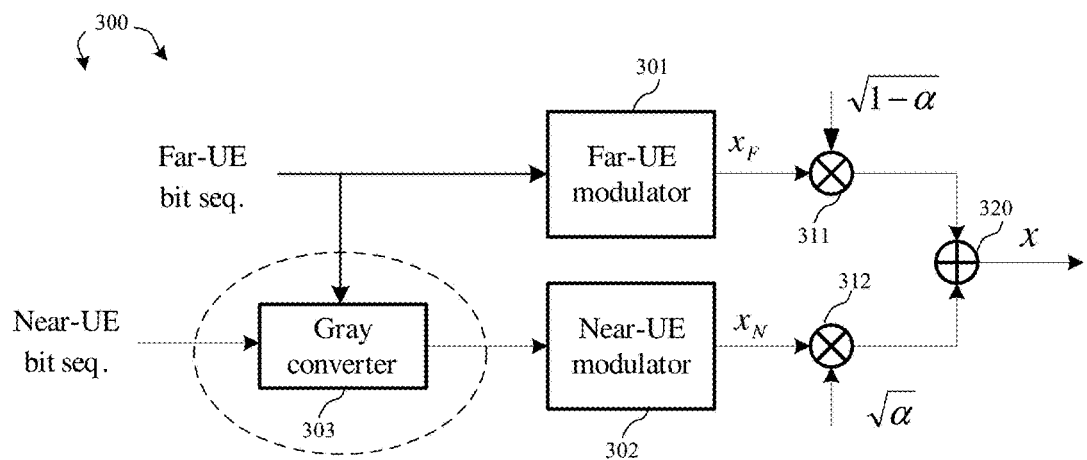
FIG. 3 illustrates the modulation of non-orthogonal multiuser access (NOMA) or semi-orthogonal multiple access (SOMA).

FIG. 3 illustrates the modulation of non-orthogonal multiuser access (NOMA) or semi-orthogonal multiple access (SOMA). In the example of FIG. 3, the transmitter comprises a modulator 300 which includes a far-UE modulator 301, a near-UE modulator 302, signal multipliers 311 and 312, and a signal combiner 320. The far-UE modulator 301 modulates the far-UE bit sequence and outputs signal $x_F$, while the near-UE modulator 302 modulates the near-UE bit sequence and outputs signal $x_N$. Signal $x_F$ is multiplied by $(1-\alpha)^{1/2}$, and combine with signal $x_N$ multiplied by $\alpha^{1/2}$ to output the final signal x to be transmitted to the receiver. The simplest way to implement the modulation of the MUST scheme is passing the bits for the near-UE and far-UE individually to their modulators and summing up the modulated symbols. This scheme is called Non-Orthogonal Multiple Access (NOMA). A modified modulation scheme is called Semi-Orthogonal Multiple Access (SOMA). As illustrated in FIG. 3, under SOMA, the coded bit sequence of the far-UE is passed directly to the far-UE's modulator 301, while the coded bits of the near-UE goes through a Gray converter 303 before entering its modulator 302.

Figure 4:
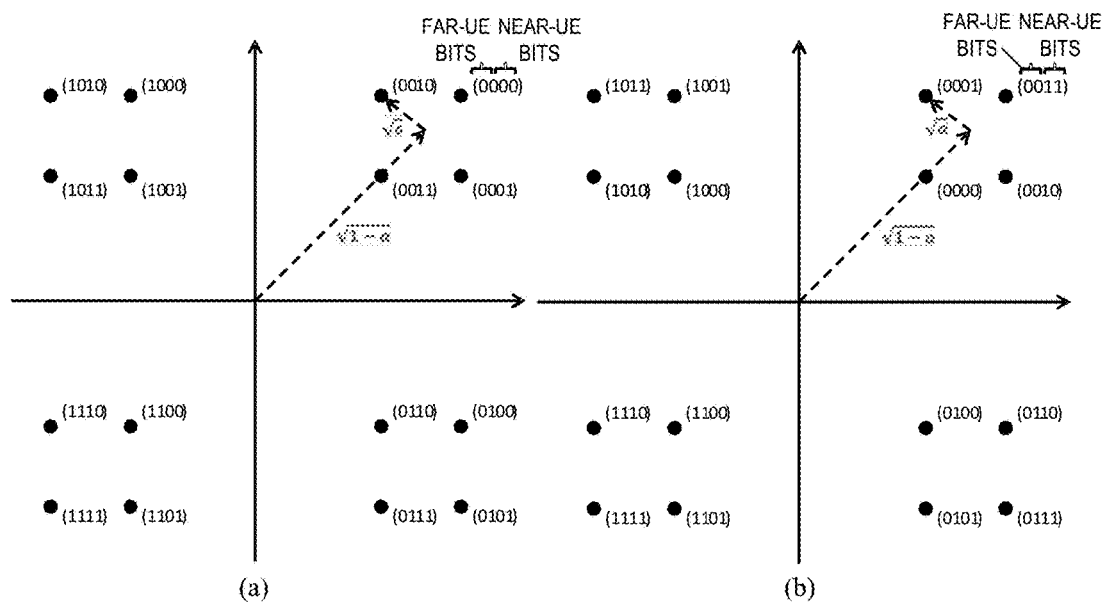
FIG. 4 illustrates examples of the constellation points associated with NOMA and SOMA.

FIG. 4 illustrates examples of the constellation points associated with NOMA and SOMA. Under NOMA, as depicted in FIG. 4(a), the constellation points resulting from such modulation scheme may not follow the Gray coding rule, i.e., the bit sequences corresponding to two adjacent constellation points differ in only one bit. On the other hand, under SOMA, the Gray converter 303 enables the constellation points of the superposed signal to fit the rule of Gray coding, i.e., the bit sequences of two adjacent constellation points differ in only one bit. Take the example that both the near-UE and far-UE have QPSK, the resulting constellation points is given in FIG. 4(b), when the power split factor $0<\alpha<1$ (the ratio of power allocated to the near-UE) is small. As shown in FIG. 4(b), for example, the four constellation points corresponding to far-UE bits 00 are aggregated at the upper right corner. More generally, the constellation points corresponding to the same far-UE bit sequence are close to each other and form a cluster.

Figure 5:
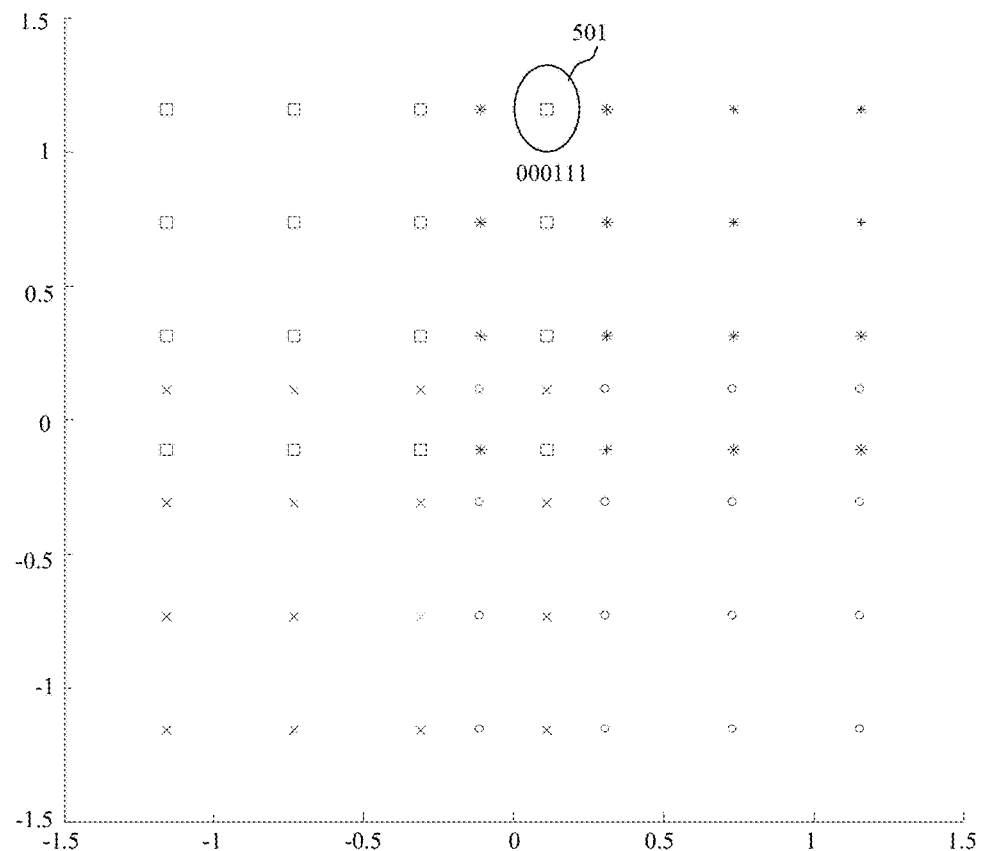
FIG. 5 illustrates an example of generating constellation points based on the modulation order of the far-UE and the near-UE and the power split factor.

FIG. 5 illustrates an example of generating constellation points based on the modulation order of the far-UE and the near-UE and the power split factor. Clustering of constellation points mentioned in the previous paragraph is not always the case when the power split factor $\alpha$ becomes large. An example is shown in FIG. 5 when QPSK and 16QAM are used for the far-UE and the near-UE, respectively, and the power split factor $\alpha=0.45$. In FIG. 5, constellation points having the same mark correspond to the same far-UE bit sequence. It can be observed the decision regions of different far-user bit sequences overlap with each other. As a result, the performance of demodulation at the receiver side is expected to degrade.

Figure 6:
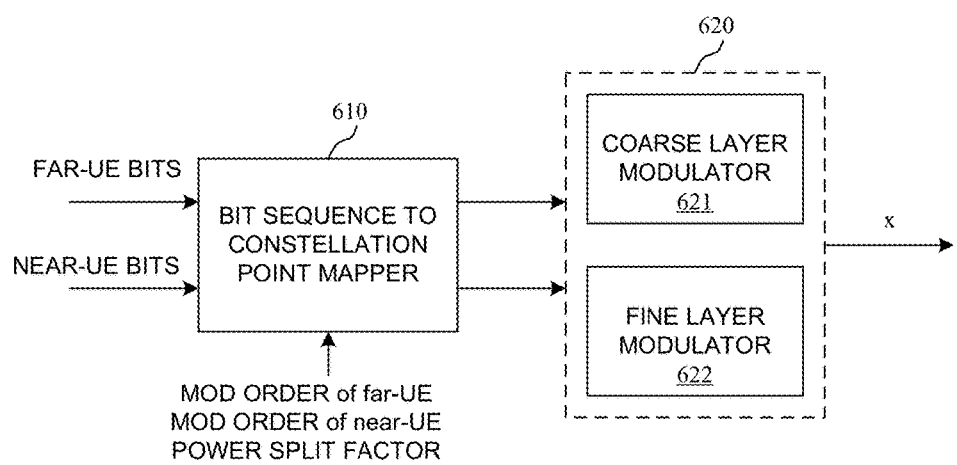
FIG. 6 illustrates a proposed method for modulating a superposed signal for MUST scheme by applying a bit sequence to constellation point mapper before entering modulation.

FIG. 6 illustrates a proposed method for modulating a superposed signal for MUST scheme by applying a bit sequence to constellation point mapper before entering modulation. In this method, both bit sequences of the near-UE and the far-UE go through a "bit sequences to constellation points mapper" 610 before entering the modulators 620 comprising a coarse layer modulator 621 and a fine layer modulator 622. The modulation order of the coarse layer is equal to the modulation order used for the signal intended for the far-UE, and the modulation order of the fine layer is equal to the modulation order used for the signal intended for the near-UE. The power split factor $\alpha$ is equal to the ratio of the power allocated to the fine layer, and the ratio of power allocated to the coarse layer is $1-\alpha$. The final modulated signal x is generated by a linear combination of the two signals generated from the coarse layer modulator 621 and the fine layer modulator 622 after proper power allocation based on the power split factor. The term "modulation order" is defined as the number of constellation points of the modulation scheme. For example, the modulation orders of QPSK, 16QAM, and 64QAM are equal to 4, 16, and 64, respectively.

Figure 7:
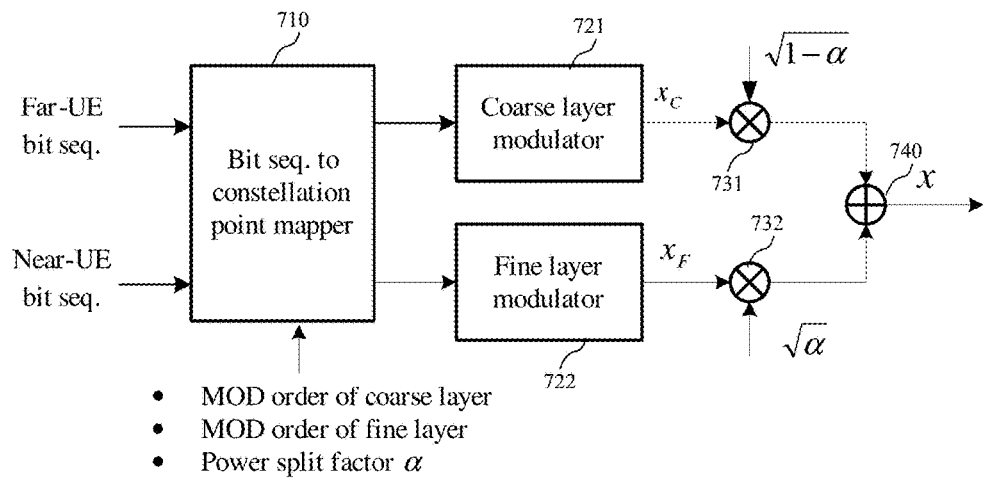
FIG. 7 illustrates one embodiment of the proposed modulator for MUST scheme.

FIG. 7 illustrates one embodiment of the proposed modulator for MUST scheme. The transmitter in FIG. 7 comprises a bit sequence to constellation point mapper 710, a coarse layer modulator 721, a fine layer modulator 722, multipliers 731 and 732, and a combiner 740. The procedure of the proposed modulation scheme for a superposed signal of MUST is given as follows. Step 1. Generate all the $2^{n+m}$ constellation points based on the modulation orders $2^n$ and $2^m$ of the coarse and fine layers, respectively, and the power split factor $\alpha$. An example of the constellation points is given in FIG. 5. Step 2. Assign a bit sequence to each of the constellation point generated in the previous step. For example, the circled point 501 depicted in FIG. 5 corresponds to the bit sequence 000111. Step 3. Take the bit sequence $a_0, a_1, \ldots, a_{n-1}$ for the signal intended for the far-UE, where the modulation order for the far-user (i.e., the modulation order of the coarse layer) is $2^n$. Take the bit sequence $b_0, b_1, \ldots, b_{m-1}$ for the signal intended for the near-UE, where the modulation order for the near-user (i.e., the modulation order of the fine layer) is $2^m$. Combine the two bit sequences to yield a new sequence $c_0, c_1, \ldots, c_{n+m-1}$ of the length n+m, where $c_0, c_1, \ldots, c_{n+m-1}$ is obtained by shuffling the bits in the concatenated sequence $a_0, a_1, \ldots, a_{n-1}, b_0, b_1, \ldots, b_{m-1}$. Step 4. According to the mapping of Step 2, a constellation point corresponding to the bit sequence $c_0, c_1, \ldots, c_{n+m-1}$ is obtained. Step 5. For the signal x corresponding to the constellation point obtained at Step 4, express it as a linear combination of two signals $x_C$ and $x_F$ yielded by the coarse layer modulator and the fine layer modulator, respectively. That is, $x=\sqrt{\alpha}x_F+\sqrt{1-\alpha}x_C$. Step 6. The modulators for the coarse layer and the fine layer generate $x_C$ and $x_F$, respectively. The modulators outputs $x_C$ and $x_F$ are linearly combined to yield $\sqrt{\alpha}x_F+\sqrt{1-\alpha}x_C$. Step 7. Repeat Steps 3 to 6 for each superposed signal.

Figure 8A:
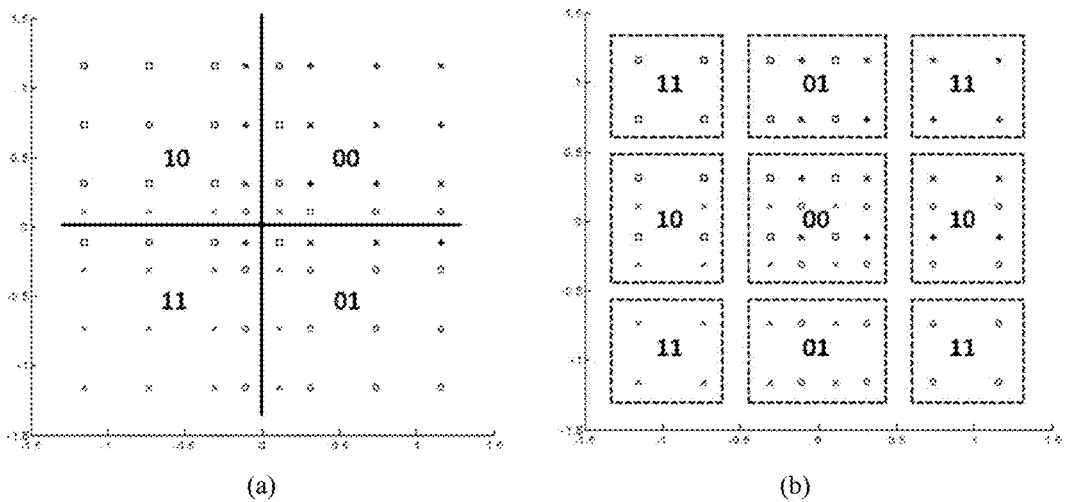
FIG. 8A illustrates two methods of bit sequence to constellation point mapping.
Figures 8B, 8C:
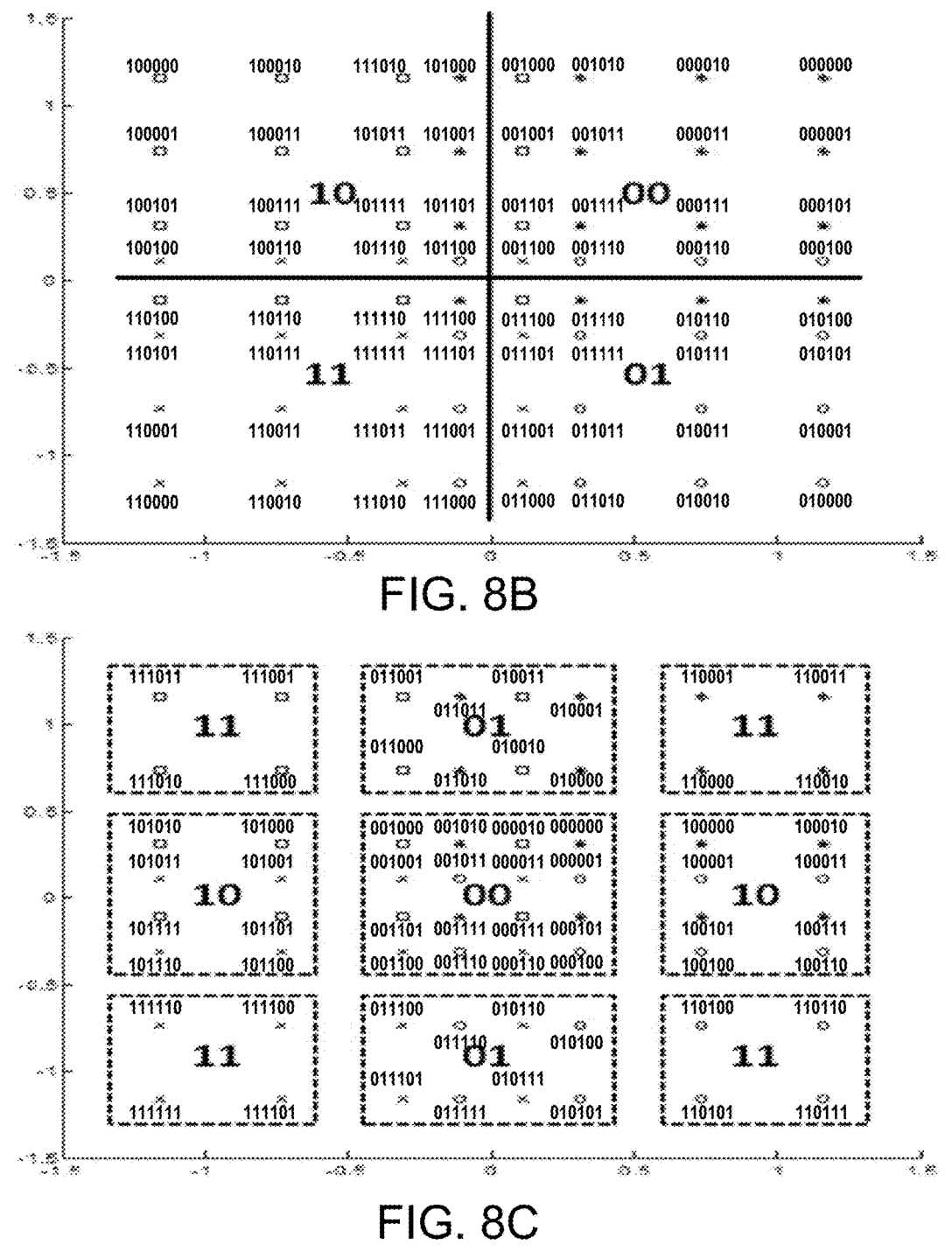

FIG. 8A illustrates two methods of bit sequence to constellation point mapping. In FIG. 8A(a) of Method #1, the superposed constellation points are divided into four quadrants. The first, second, third, and fourth quadrants correspond to far-UE bit sequences of 00, 10, 11, and 01, respectively. FIG. 8B illustrates one example of Method #1 of bit sequence to constellation point mapping. In the example of FIG. 8B, each constellation point is assigned with a bit sequence of 6-bit long. The two MSB are for far-UE, and the four LSB are for near-UE. The gray coding rule is satisfied.

In FIG. 8A(b) of Method #2, the whole region is partitioned into several sub-regions according to the clustering of the constellation points. For example, the 16 center-most points correspond to far-UE bit sequence 00, and the points located at the four region corners are associated with the sequence 11. FIG. 8C illustrates one example of Method #2 of bit sequence to constellation point mapping. In an exemplary embodiment, the different modulators can be unified into one modulator by providing different parameters and settings. In addition, different weighting factors $\sqrt{\alpha}$ and $\sqrt{1-\alpha}$ can be applied to different outputs, e.g., output points at different times or frequencies.

The procedure of Method #1 is given as follows. Step 1: Generate all the $2^{n+m}$ constellation points based on the modulation orders $2^n$ and $2^m$ of the coarse and fine layers, respectively, and the power split factor $\alpha$. Step 2: Assign a bit sequence to each of the constellation points generated in the previous step so that the following two conditions are met. The first condition—The bit sequences corresponding to any adjacent constellation points differ in only 1 bit. The second condition—According to the i most significant bits (MSB) of the bit sequences, i=1, . . . , n+m, all constellation points are subdivided into $2^i$ groups, with each group having the same number of constellation points, and those constellation points in the same group are co-located and form a cluster in their positions. For example, in FIG. 5(a), constellation points located at the first, second, third, and fourth quadrants have their 2 MSB bits of the associated bit sequences equal to 00, 10, 11, and 01, respectively. Step 3: Given the bit sequence $a_0, a_1, \ldots, a_{n-1}$ for the signal intended to the far-UE, where the modulation order for the far-user (i.e., the modulation order of the coarse layer) is $2^n$. Given the bit sequence $b_0, b_1, \ldots, b_{m-1}$ for the signal intended to the near-UE, where the modulation order for the near-user (i.e., the modulation order of the fine layer) is $2^m$. Concatenate the two bit sequences to yield a concatenated sequence $a_0, a_1, \ldots, a_{n-1}, b_0, b_1, \ldots, b_{m-1}$. Step 4: According to the mapping of Step 2, a constellation point corresponding to the concatenated bit sequence $a_0, a_1, \ldots, a_{n-1}, b_0, b_1, \ldots, b_{m-1}$ is obtained. Step 5: For the signal x corresponding to the constellation point obtained at Step 4, express it as a linear combination of two signals $x_C$ and $x_F$ yielded by the coarse layer modulator and the fine layer modulator, respectively. That is, $x=\sqrt{\alpha}x_F+\sqrt{1-\alpha}x_C$. Step 6: The modulators for the coarse layer and the fine layer generate $x_C$ and $x_F$, respectively. The modulators outputs $x_C$ and $x_F$ are linearly combined to yield $x=\sqrt{\alpha}x_F+\sqrt{1-\alpha}x_C$. Step 7. Repeat Steps 3 to 6 for each superposed signal.

Figure 9:
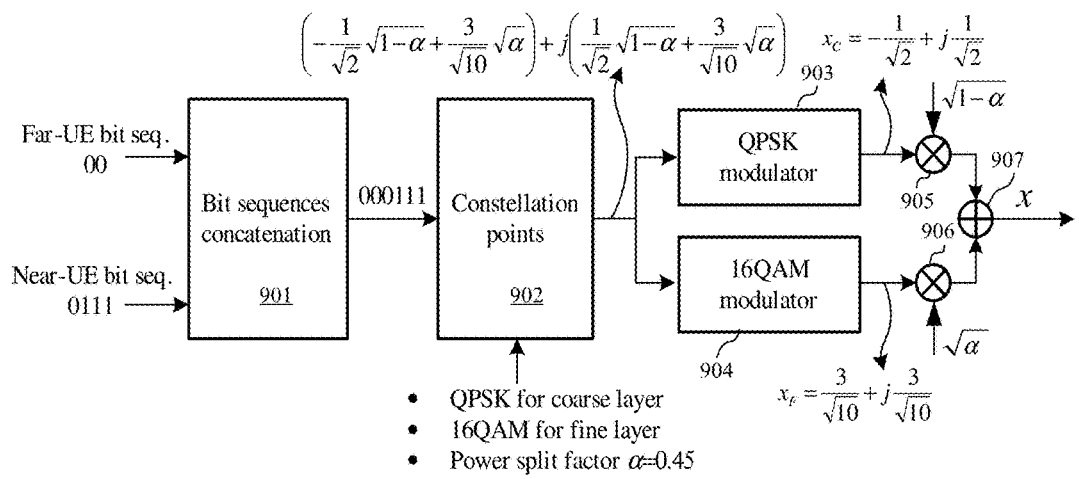
FIG. 9 illustrates one example of the proposed modulator for MUST scheme applying the first method of bit sequence to constellation point mapping.

FIG. 9 illustrates one example of the proposed modulator for MUST scheme applying Method #1 of bit sequence to constellation point mapping. The transmitter in FIG. 9 comprises a bit sequence generator 901, a constellation points mapper 902, a QPSK modulator 903, a 16QAM modulator 904, multipliers 905 and 906, and a combiner 907. In the example of FIG. 9, the modulator for coarse layer is QPSK, and the modulation for fine layer is 16QAM. Each far-UE bit sequence is 2-bit long (e.g., 00), and each near-UE bit sequence is 4-bit long (e.g., 0111). Bit sequence generator 901 combines each of the two bit sequences and generates a new concatenate sequence (e.g., 000111). Constellation points mapper assigns each new sequence to each of the constellation points such that the two conditions are met. For the signal x corresponding to the constellation point is expressed as a linear combination of the two signals $x_C$ and $x_F$, yielded by the QOSK modulator and the 16QAM modulator, respectively. Note that in one example, the mapping between bit sequences and constellation points of Step 2 is the same as the mapping of 64QAM used in LTE.

For method #1, as depicted in FIG. 8B, it is seen the 4 center-most points are close to each other. However, a wrong detection of the 4 points results in 1-bit error in the far-UE's bits. For Method #2, as depicted in FIG. 8C, these 4 points all correspond to the same far-UE's bit sequence 00. Therefore, wrong detection among the 4 points does not lead to far-UE's bit error. To realize this idea, the way of partitioning the whole region into sub-regions varies with the power split factor $\alpha$ between the coarse and fine layers and the modulation orders of the two layers. Besides this idea, there may be others which are favorable to the modulator design for the superposed signal from the perspective of complexity, performance, implementations, and so on. The procedure of Method #2 is the same as that of Method #1 except for replacing the second condition of Step 2 with other condition(s) required to fulfill the desirable properties of the modulator design.

Figure 10:
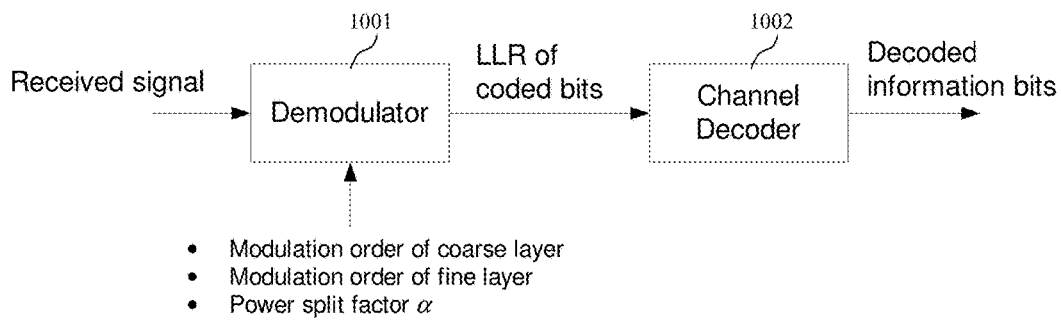
FIG. 10 illustrates the demodulation and the decoding at the receiver side in accordance with the proposed modulator for MUST.

FIG. 10 illustrates the demodulation and the decoding at the receiver side in accordance with the proposed modulator for MUST. The following receives can be used for MUST: 1) a maximum likelihood (ML) receiver is used for the signal intended for the near-user; 2) an ML receiver is used for the signal intended for the far-user; and 3) a minimum mean square error (MMSE) receiver is used for the signal intended for the far-user. The receiver in FIG. 10 comprises a demodulator 1001 and a channel decoder 1002. Upon reception of the signal, the demodulator examines the received symbol. The demodulator selects, as it estimates of what was actually transmitted, that point on the constellation diagram which is closest (in a Euclidean distance sense) to that of the received symbol. This is ML detection. On the other hand, an MMSE estimator is an estimation method which minimizes the mean square error (MSE), which is a common measure of estimator quality of dependent variables including the modulation orders and the power split factor.

When an ML receiver is adopted for near-user's signal, the following procedures are executed: 1) Generate all the $2^{n+m}$ constellation points based on the modulation orders $2^n$ and $2^m$ of the coarse and fine layers, respectively, and the power split factor $\alpha$. 2) Associate each of the $2^{n+m}$ constellation points generated in the previous step with a bit sequence of the near-user. 3) Compute the log likelihood ratio (LLR) for each coded bit of the near-user's signal based on the distances between the received signal and a set of constellation points. 4) Pass the LLRs obtained in the previous step to the channel decoder. Note that both near-UE and far-UE need to know how bit sequences are assigned, e.g., whether method #1 of FIG. 8B is used, or method #2 of FIG. 8C is used. With this knowledge, then the near-UE can take the 4 LSB bits and the far-UE can take the 2 MSB bits based on the bit sequence to constellation map. For near-UE, it may also need to computing the LLR based on knowledge of the far-UE signal.

When an ML receiver is adopted for far-user's signal, the following procedures are executed: 1) Generate all the $2^{n+m}$ constellation points based on the modulation orders $2^n$ and $2^m$ of the coarse and fine layers, respectively, and the power split factor $\alpha$. 2) Associate each of the $2^{n+m}$ constellation points generated in the previous step with a bit sequence of the far-user. 3) Compute the LLR for each coded bit of the far-user's signal based on the distances between the received signal and a set of constellation points. 4) Pass the LLRs obtained in the previous step to the channel decoder. Note that both near-UE and far-UE need to know how bit sequences are assigned, e.g., whether method #1 of FIG. 8B is used, or method #2 of FIG. 8C is used. With this knowledge, then the near-UE can take the 4 LSB bits and the far-UE can take the 2 MSB bits based on the bit sequence to constellation map.

When an MMSE receiver is adopted for far-user's signal, the following procedures are executed: 1) Generate a set of constellation points based on the modulation orders $2^n$ and $2^m$ of the coarse and fine layer, respectively, and the power split factor $\alpha$. 2) Associate each of the constellation points generated in the previous step with a bit sequence of the far-user. 3) Compute the LLR for each coded bit of the far-user's signal based on the full set or a subset of a) the distances between the received signal and a set of constellation points; b) the power split factor $\alpha$; c) the modulation order $2^n$ of the coarse layer; d) the modulation order $2^m$ of the fine layer. 4) Pass the LLRs obtained in the previous step to the channel decoder.

According to the procedures of the receiver illustrated above, the following information is required for the receiver to perform demodulation and channel decoding: Modulation order of the coarse layer, Modulation order of the fine layer, and Power split factor. The network can send some or all of the above parameters or some information helpful to derive the above parameters to the receiver to assist demodulation and channel decoding. For those parameters not signaled by the network, the receiver can perform blind detection to detect the parameter(s) by itself.

Figure 11:
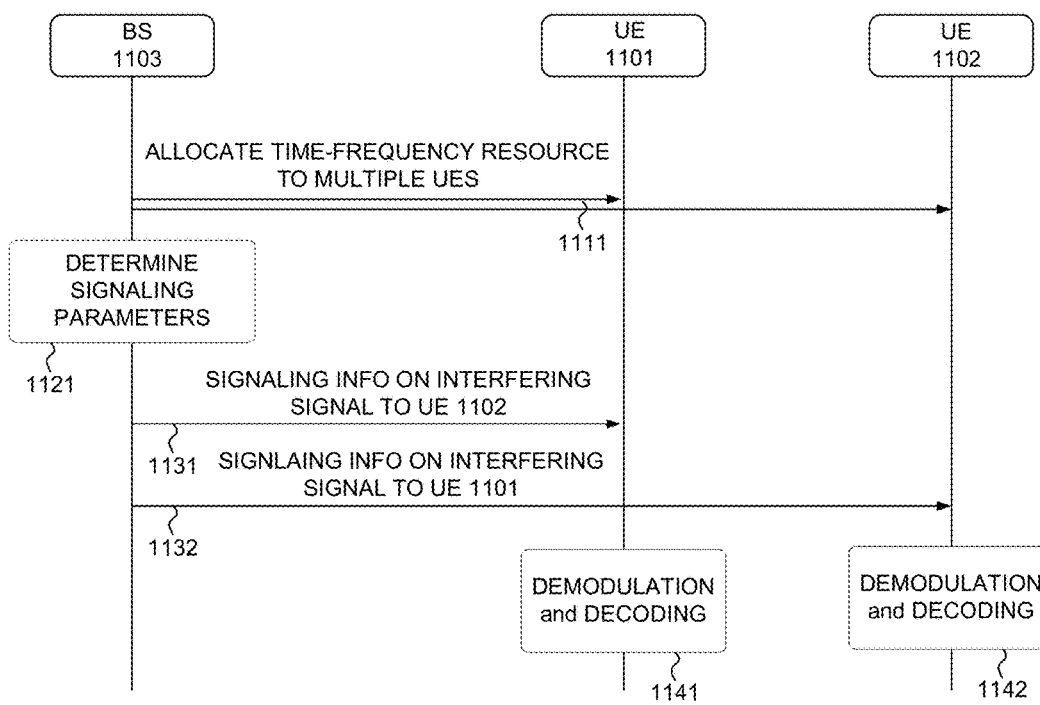
FIG. 11 illustrates a downlink MUST operation procedure between a BS and two co-channel UEs in accordance with one novel aspect.

FIG. 11 illustrates a downlink MUST operation procedure between a BS and two co-channel UEs in accordance with one novel aspect. In step 1111, BS 1103 allocates a time-frequency resource to multiple UEs including UE 1101 and UE 1102 for MUST operation. In step 1121, BS 1103 determines which parameters about interfering signals need to be signaled to the UEs. In one embodiment, BS 1103 transmits MUST-related parameters including the modulation order of the far UE, the modulation order of the near-UE, and the power split factor. In step 1131, BS 1103 signals UE 1101 information about interfering signals dedicated to UE 1102. In step 1132, BS 1103 signals UE 602 information about interfering signals dedicated to UE 601. Note that such information may be signaled via PDCCH/ePDCCH/RRC, and may be signaled separately or aggregated together in one message. In step 1141, UE 601 performs demodulation and decoding based on the received information. In step 1142, UE 1102 performs demodulation and decoding based on the received information. In one embodiment, the near-UE also performs interference cancellation.

Figure 12:
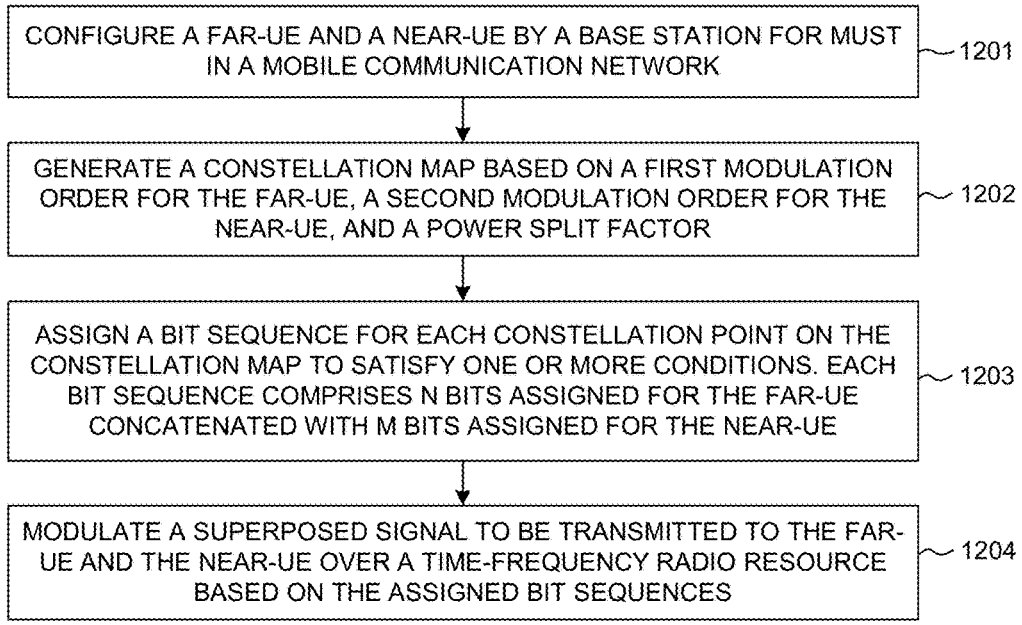
FIG. 12 is a flow chart of a method of modulating superposed signals for MUST scheme from eNB perspective in accordance with one novel aspect.

FIG. 12 is a flow chart of a method of modulating superposed signals for MUST scheme from eNB perspective in accordance with one novel aspect. In step 1201, a base station configures a far-UE and a near-UE for MUST operation in a mobile communication network. In step 1202, the base station generates a constellation map based on a first modulation order for the far-UE, a second modulation order for the near-UE, and a power split factor. In step 1203, the base station assigns a bit sequence for each constellation point on the constellation map to satisfy one or more conditions. Each bit sequence comprises n bits assigned for the far-UE concatenated with m bits assigned for the near-UE. In step 1204, the base station modulates and outputs a superposed signal to be transmitted to the far-UE and the near-UE over a time-frequency radio resource based on the assigned bit sequences.

Figure 13:
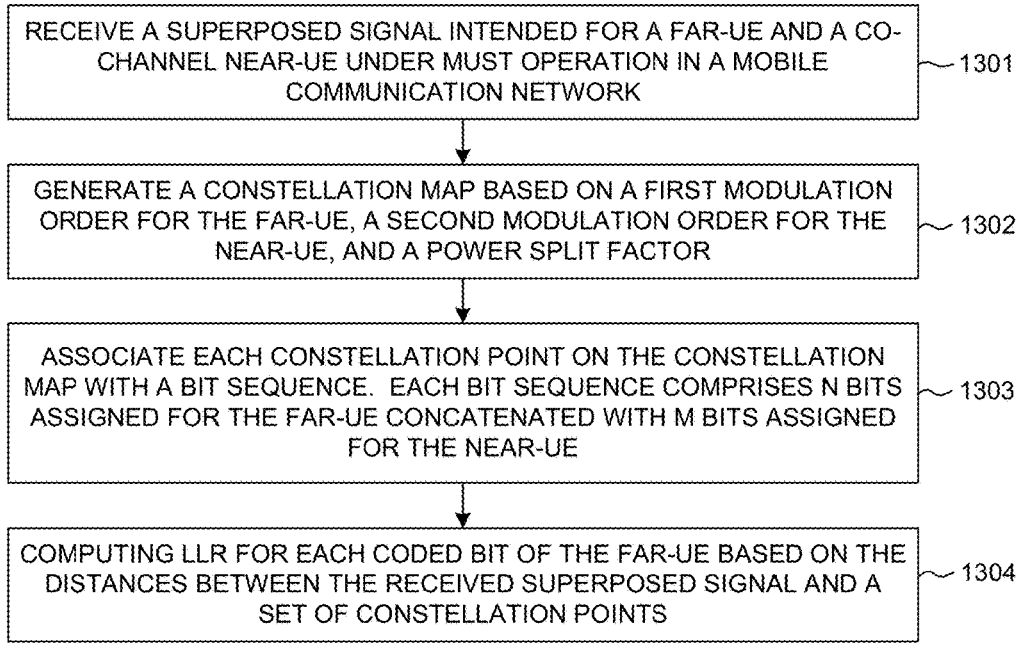
FIG. 13 is a flow chart of a method of demodulating superposed signals for MUST scheme from UE perspective in accordance with one novel aspect.

FIG. 13 is a flow chart of a method of demodulating superposed signals for MUST scheme from UE perspective in accordance with one novel aspect. In step 1301, a UE receives a superposed signal intended for the UE and a co-channel UE under MUST operation in a mobile communication network. In step 1302, the UE generates a constellation map based on a first modulation order for the UE, a second modulation order for the co-channel UE, and a power split factor. In step 1303, the UE associates each constellation points on the constellation map with a bit sequence. Each bit sequence comprises n bits assigned for the UE concatenated with m bits assigned for the co-channel UE. In step 1304, the UE computes an LLR for each coded bit of the UE based on the distances between the received superposed signal and a set of constellation points. In one embodiment, the UE is a far-UE, the co-channel UE is a near UE, and the far-UE receiver is an ML receiver or an MMSE receiver. In another embodiment, the UE is a near-UE, the co-channel UE is a far-UE, and the near-UE receiver is an ML receiver.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method for a base station that is configured to operate under a multiuser superposition transmission (MUST) operation in a mobile communication network, comprising:
generating a constellation map based on a first modulation having an order of $2^n$, a second modulation having an order of $2^m$, and a power split factor, m and n being positive integers,
the constellation map including $2^{m+n}$ constellation points, and
the constellation points including $2^n$ first groups of $2^m$ constellation points, the $2^n$ first groups being positioned based on the first modulation and the power split factor, and the $2^m$ constellation points within each first group being positioned based on the second modulation and the power split factor;
assigning, by a processor of the base station, a bit sequence for each constellation point on the constellation map,
each bit sequence including n bits assigned for a first terminal device in the mobile communication network concatenated with m bits assigned for a second terminal device in the mobile communication network,
the constellation points being arranged into $2^n$ second groups of constellation points according to clustering of the constellation points,
each second group including $2^m$ constellation points, being assigned a respective n-bit sequence for the first terminal device, and overlapping two or more of the $2^n$ first groups, and
each of the $2^m$ constellation points within a particular second group being assigned a respective m-bit sequence for the second terminal device;
modulating and outputting, by the processor of the base station using the first modulation and the second modulation, a superposed signal corresponding to a particular constellation point that represents a particular bit sequence based on the assigned bit sequences; and
transmitting the superposed signal to the mobile communication network.

2. The method of claim 1, wherein the assigned bit sequences for the constellation points on the constellation map satisfy one or more conditions under different power split factors.

3. The method of claim 2, wherein the assigned bit sequences satisfy Gray coding rule where every two bit sequences corresponding to any adjacent constellation points differ in only one bit.

4. The method of claim 1, wherein constellation points in the same one of the $2^n$ second group are assigned with the same n-bit sequence for the first terminal device that is farther from the base station than the second terminal.

5. The method of claim 1, wherein constellation points having the closest distance are assigned with the same n-bit sequence for the first terminal device that is farther from the base station than the second terminal.

6. The method of claim 1, wherein the modulating and outputting the superposed signal comprises:
modulating a first signal using the first modulation to obtain a first layer signal;
modulating a second signal using the second modulation to obtain a second layer signal; and
combining the first layer signal and second layer signal to output the superposed signal.

7. The method of claim 6, wherein the combining is based on the power split factor.

8. The method of claim 1, comprising:
transmitting MUST-related information to the first terminal and the second terminal, wherein the MUST-related information comprises the order of the first modulation, the order of the second modulation, and the power split factor.

9. A base station that is configured to operate under a multiuser superposition transmission (MUST) operation in a mobile communication network, comprising:
a processor configured to:
generate a constellation map based on a first modulation having an order of $2^n$, a second modulation having an order of $2^m$, and a power split factor, m and n being positive integers,
the constellation map including $2^{m+n}$ constellation points, and
the constellation points including $2^n$ first groups of $2^m$ constellation points, the $2^n$ first groups being positioned based on the first modulation and the power split factor, and the $2^m$ constellation points within each first group being positioned based on the second modulation and the power split factor;
assign a bit sequence for each constellation point on the constellation map,
each bit sequence including n bits assigned for a first terminal device in the mobile communication network concatenated with m bits assigned a second terminal device in the mobile communication network,
the constellation points being arranged into $2^n$ second groups of constellation points according to clustering of the constellation points,
each second group including $2^m$ constellation points, being assigned a respective n-bit sequence for the first terminal device, and overlapping two or more of the $2^n$ first groups, and each of the $2^m$ constellation points within a particular second group being assigned a respective m-bit sequence for the second terminal device; and modulate and output, using the first modulation and the second modulation, a superposed signal corresponding to a particular constellation point that represents a particular bit sequence based on the assigned bit sequences; and a transmitter configured to transmit the superposed signal to the mobile communication network.

10. The base station of claim 9, wherein the assigned bit sequences for the constellation points on the constellation map satisfy one or more conditions under different power split factors.

11. The base station of claim 10, wherein the assigned bit sequences satisfy Gray coding rule where every two bit sequences corresponding to any adjacent constellation points differ in only one bit.

12. The base station of claim 9, wherein constellation points in the same one of the $2^n$ second groups are assigned with the same n-bit sequence for the first terminal device that is farther from the base station than the second terminal.

13. The base station of claim 9, wherein constellation points having the closest distance are assigned with the same n-bit sequence for the first terminal device that is farther from the base station than the second terminal.

14. The base station of claim 9, wherein the processor is configured to:

modulate a first signal using the first modulation to obtain a first layer signal;

modulate a second signal using the second modulation to obtain a second layer signal; and combine the first layer signal and the second layer signal to output the superposed signal.

15. The base station of claim 14, wherein the processor is configured to combine the first layer signal and the second layer signal to output the superposed signal based on the power split factor.

16. The base station of claim 9, wherein the transmitter is configured to:

transmit MUST-related information to the first terminal and the second terminal, wherein the MUST-related information comprises the order of the first modulation, the order of the second modulation, and the power split factor.

* * * * *